(12) United States Patent
Haran et al.

(10) Patent No.: US 9,088,931 B2
(45) Date of Patent: Jul. 21, 2015

(54) SYSTEM SELECTION BASED ON SERVICE-SPECIFIC PREFERRED ROAMING LIST IN A WIRELESS NETWORK

(75) Inventors: Narayanan Haran, Hoffman Estates, IL (US); Narothum Saxena, Hoffman Estates, IL (US); Michael Irizarry, Algonquin, IL (US)

(73) Assignee: United States Cellular Corporation, Chicago, IL (US)

( * ) Notice: Subject to any disclaimer, the term of this patent is extended or adjusted under 35 U.S.C. 154(b) by 1749 days.

(21) Appl. No.: 12/346,599

(22) Filed: Dec. 30, 2008

(65) Prior Publication Data
US 2010/0167724 A1      Jul. 1, 2010

(51) Int. Cl.
*H04W 48/12* (2009.01)
*H04W 8/20* (2009.01)

(52) U.S. Cl.
CPC .............. *H04W 48/12* (2013.01); *H04W 8/205* (2013.01)

(58) Field of Classification Search
CPC ............................. H04W 48/12; H04W 8/205
USPC ........ 455/403, 418–420, 414.1–414.4, 422.1, 455/445, 500, 517, 550.1, 552.1–553.1, 455/551, 574, 432.1–435.3
See application file for complete search history.

(56) References Cited

U.S. PATENT DOCUMENTS

| | | | |
|---|---|---|---|
| 5,950,130 A * | 9/1999 | Coursey ..................... | 455/432.1 |
| 5,983,092 A | 11/1999 | Whinnett et al. | |
| 6,343,216 B1 * | 1/2002 | Kim et al. ..................... | 455/450 |
| 6,549,770 B1 | 4/2003 | Marran | |
| 6,564,055 B1 * | 5/2003 | Hronek ......................... | 455/433 |
| 6,625,451 B1 * | 9/2003 | La Medica et al. ........... | 455/434 |
| 7,277,705 B2 * | 10/2007 | Casaccia et al. ........... | 455/435.1 |
| 7,349,695 B2 | 3/2008 | Oommen et al. | |
| 8,954,070 B2 * | 2/2015 | Welnick et al. ............ | 455/435.2 |
| 2002/0173316 A1 * | 11/2002 | Jang et al. ..................... | 455/453 |
| 2004/0076130 A1 * | 4/2004 | Uchida et al. ................ | 370/335 |
| 2006/0058011 A1 * | 3/2006 | Vanska et al. .............. | 455/414.3 |
| 2007/0123231 A1 | 5/2007 | Kim | |
| 2008/0132229 A1 | 6/2008 | Oommen et al. | |
| 2008/0139241 A1 | 6/2008 | Kiyomoto | |
| 2009/0098872 A1 * | 4/2009 | Deshpande et al. ........ | 455/435.2 |
| 2009/0247206 A1 * | 10/2009 | Yacono ......................... | 455/515 |

FOREIGN PATENT DOCUMENTS

WO      WO 2005/041611 A1      5/2005

* cited by examiner

*Primary Examiner* — Sharad Rampuria
(74) *Attorney, Agent, or Firm* — Leydig, Voit & Mayer, Ltd.

(57) ABSTRACT

A home wireless network is provided that communicates an improved Preferred Roaming List (PRL) that includes service type and service priority indicators for a plurality of wireless service combinations and corresponding roaming networks. Preferably, the service type indicator is a numerical indicator that encodes a combination of multiple wireless services offered by each roaming partner network. In case when more than one roaming network provides the requested wireless service, the service priority indicator provides a priority of selection of roaming networks for a given requested service in accordance with a plurality of parameters.

17 Claims, 4 Drawing Sheets

Acquisition Table

| Index | Type | Description | Parameters |
|---|---|---|---|
| 0 | 0110 | PCS-CDMA | Channels 100,125 |
| 1 | 0010 | Cellular CDMA | Sys A, Prim, Sec |

System Table

| Index | SID | NID | Service-type | NEG/PREF | GEO | PRI | ACQ | ROAM |
|---|---|---|---|---|---|---|---|---|
| 0 | 1394 | 1000 | 7 | Pref | NEW | 3 | 0 | 1 |
| 1 | 5205 | 2300 | 3 | Neg | SAME | 2 | 1 | 0 |

SYSTEM SELECTION BASED ON SERVICE-SPECIFIC PREFERRED ROAMING LIST IN A WIRELESS NETWORK

FIELD OF THE INVENTION

This invention relates generally to the field of wireless communications and more specifically to enhanced roaming system selection.

BACKGROUND OF THE INVENTION

Wireless services available to mobile subscribers have rapidly evolved in recent years from providing voice-only communications to including high-speed data and location based services (LBS). Mobile subscribers are now able to take advantage of a plethora of offered wireless services to browse the web, download music and video files, communicate via email, locate relatives, receive geographical guidance based on subscriber location, and obtain directions.

However, the rapid transition to a multi-service based mobile environment by wireless service providers operating heterogeneous network technologies resulted in networks based on various standards that have their own migration timelines and paths. For example, basic data and location based services that fall outside of the FCC-mandated schedule (e.g., street guidance services) are typically implemented on a carrier-specific schedule. This results in a non-uniform availability of various services across different mobile networks and platforms and significantly complicates access to various wireless services during roaming.

Traditionally, a Preferred Roaming List (PRL) has been used by the wireless operators to control the availability of roaming networks for a mobile subscriber. However, traditional PRL-controlled roaming schemes are not conducive to taking into account a large number of different wireless service combinations that may be offered among all roaming partners, which may result in failed service initiations on roaming networks that do not provide the requested service. Additionally, traditional PRL-controlled roaming schemes lack an efficient way to take into account multiple factors that affect selecting the most optimum roaming network on which to initiate the requested wireless service.

For instance, a roaming scheme described in U.S. Publication No. 2008/0139241 to Kiymoto (hereinafter "Kiymoto") assigns each call type an access technology preference for initiation of outgoing calls. For example, the mobile gives priority to systems complying with an EVDO access technology type for "videophone" call initiations. However, the roaming scheme in Kiymoto operates on an access technology level and does not address a way to take into account multiple service combinations specific to each roaming network provider. Since priority is assigned on access technology basis, the roaming scheme in Kiymoto further lacks the ability to prioritize system selection based on service parameters that differ among specific roaming network providers.

U.S. Publication No. 2007/0123231 to Kim (hereinafter "Kim") describes a mobile having multiple PRL versions, thereby allowing an operator to restrict unauthorized access to an "enhanced" system. Specifically, if the mobile exceeds a predetermined number of failed attempts to access an "enhanced" system, the "enhanced" PRL is replaced with a "basic" PRL and access to the "enhanced" system is restricted. However, Kim does not address a way to take into account multiple wireless services offered by each roaming network provider. Furthermore, Kim does not address taking into account multiple factors that affect selecting the most optimum roaming service provider on which to initiate the requested wireless service.

U.S. Publication No. 2008/0132229 to Oommen et al. (hereinafter "Oommen") describes a mobile unit that receives a custom PRL based on the type of access technology (e.g., CDMA, GSM) on which the mobile is attempting to roam. However, Oommen does not describe a service-specific PRL and does not address a way to take into account multiple wireless services offered by various roaming network providers. Furthermore, Oommen does not address taking into account multiple factors that affect selecting the most optimum roaming network provider on which to initiate the requested wireless service.

U.S. Pat. No. 5,983,092 to Whinnett et al. (hereinafter "Whinnett") does not rely on PRL-based roaming and, as a result, requires additional messaging between the mobile and a plurality of candidate networks to identify a network capable of providing the requested service.

Finally, PCT Publication No. WO2005/041611 to Babbar et al. (hereinafter "Babbar") similarly does not rely on PRL-based roaming and requires user interaction to manually select an "access string," via a user interface, describing the type of service to be initiated.

Therefore, a need exists for an efficient way to facilitate home networks that utilize PRL-based roaming to take into account a significant number of various wireless service combinations offered by individual roaming partners, as well as to take into account multiple factors affecting the selection of an optimum roaming network that provides the desired service or service mix.

BRIEF SUMMARY OF THE INVENTION

To solve the foregoing problems with service-based roaming, embodiments of the invention are used to provide a home wireless network that takes into account multiple service combinations specific to each roaming network provider and prioritizes system selection based on service parameters that differ among specific roaming providers. The home network communicates an improved Preferred Roaming List (PRL) which includes service type and service priority indicators for a plurality of wireless service combinations and corresponding roaming networks. Preferably, the service type indicator is a numerical indicator that encodes a combination of multiple wireless services offered by each roaming partner network. By encoding an entire combination of services offered by each roaming partner into a single indicator, the service type indicator provides a scalable solution that is capable of taking into account additional future services without the need to add multiple dedicated service fields to the PRL.

When the mobile device initiates a request for a particular wireless service while roaming, it reads the improved PRL previously received from an Over-the-Air (OTA) server and identifies those roaming networks that include a service mix that is capable of providing the requested service. This prevents unsuccessful wireless service requests that may be initiated on a default roaming network selected during the mobile device's idle state when the default roaming network does not support the requested service. In case when more than one roaming network provides the requested wireless service, the service priority indicator provides a priority of selection of roaming networks for a given requested service in accordance with a plurality of parameters.

In an embodiment, to efficiently represent multiple service combinations in the system table of the PRL, the OTA server processes a binary word representing a particular combination of services offered by each roaming network and converts it to a decimal equivalent, thereby reducing the amount of fields necessary to store and display the service combination. Likewise, the service priority indicator numerically indicates the service level preferences for each roaming network. Hence, if multiple roaming networks in the PRL system table include the requested service in the combination of services designated by the service type indicator, the mobile device sorts the matching networks in the order of priority corresponding to the type of the service request and selects the roaming network with highest priority. Preferably, the service priority indicator is based on one or more parameters associated with each service offered by a given roaming network. For instance, each roaming network is ranked by service cost, historical reliability of the service, average data throughput associated with the service (if applicable), and one or more Service Level Agreement (SLA) parameters guaranteed by a given roaming network, such as a minimum guaranteed data rate, or a maximum drop call rate.

In one aspect of the invention, a wireless communication system is provided for service-based roaming, the system comprising (a) a home wireless network providing access to a wireless communication device in a home geographic area, (b) a server associated with the home wireless network, and (c) a database associated with the server for storing in computer readable memory a Preferred Roaming List comprising a service type indicator corresponding to a SID and NID identifier pair, the SID and NID identifier pair representing a roaming network corresponding to a geographical area served by a roaming service provider and available to the wireless communication device for roaming, wherein the service type indicator is a numerical indicator that represents a combination of wireless services offered by the roaming network, said server capable of causing the Preferred Roaming List to be communicated to the wireless communication device for making a selection of the roaming network based at least in part on the combination of wireless services represented by the service type indicator.

In another aspect of the invention, a method is provided for accessing a wireless service on a roaming wireless network via a Preferred Roaming List, the method comprising (a) receiving the Preferred Roaming List via one or more over-the-air messages, the Preferred Roaming List comprising a numerical service type indicator representing a combination of wireless services offered by the roaming wireless network, the service type indicator corresponding to a SID and NID identifier pair, the SID and NID identifier pair representing the roaming wireless network corresponding to a geographical area served by a roaming service provider and available to a wireless communication device for roaming, (b) storing the Preferred Roaming List in computer readable memory of the wireless communication device, (c) accessing a default roaming wireless network during an idle state of the wireless communication device, in accordance with the Preferred Roaming List, (d) processing a wireless service request for accessing the wireless service, and (e) in response to the service request, selecting the roaming wireless network based at least in part on the combination of wireless services represented by the service type indicator when the default roaming wireless network does not support the requested wireless service.

In yet another aspect of the invention, a method is provided for managing a Preferred Roaming List for a wireless communication device, the method comprising (a) storing, in a computer readable memory, a Preferred Roaming List comprising a service type indicator corresponding to a roaming network in a geographical area served by a roaming service provider and available to the wireless communication device for roaming, said service type indicator comprising a numerical indicator representing a combination of wireless services offered by the roaming service provider, and (b) communicating the Preferred Roaming List to the wireless communication device for making a selection of the roaming network based at least in part on the combination of wireless services represented by the service type indicator.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE INVENTION

The following examples further illustrate the invention but, of course, should not be construed as in any way limiting its scope.

Figure 1:
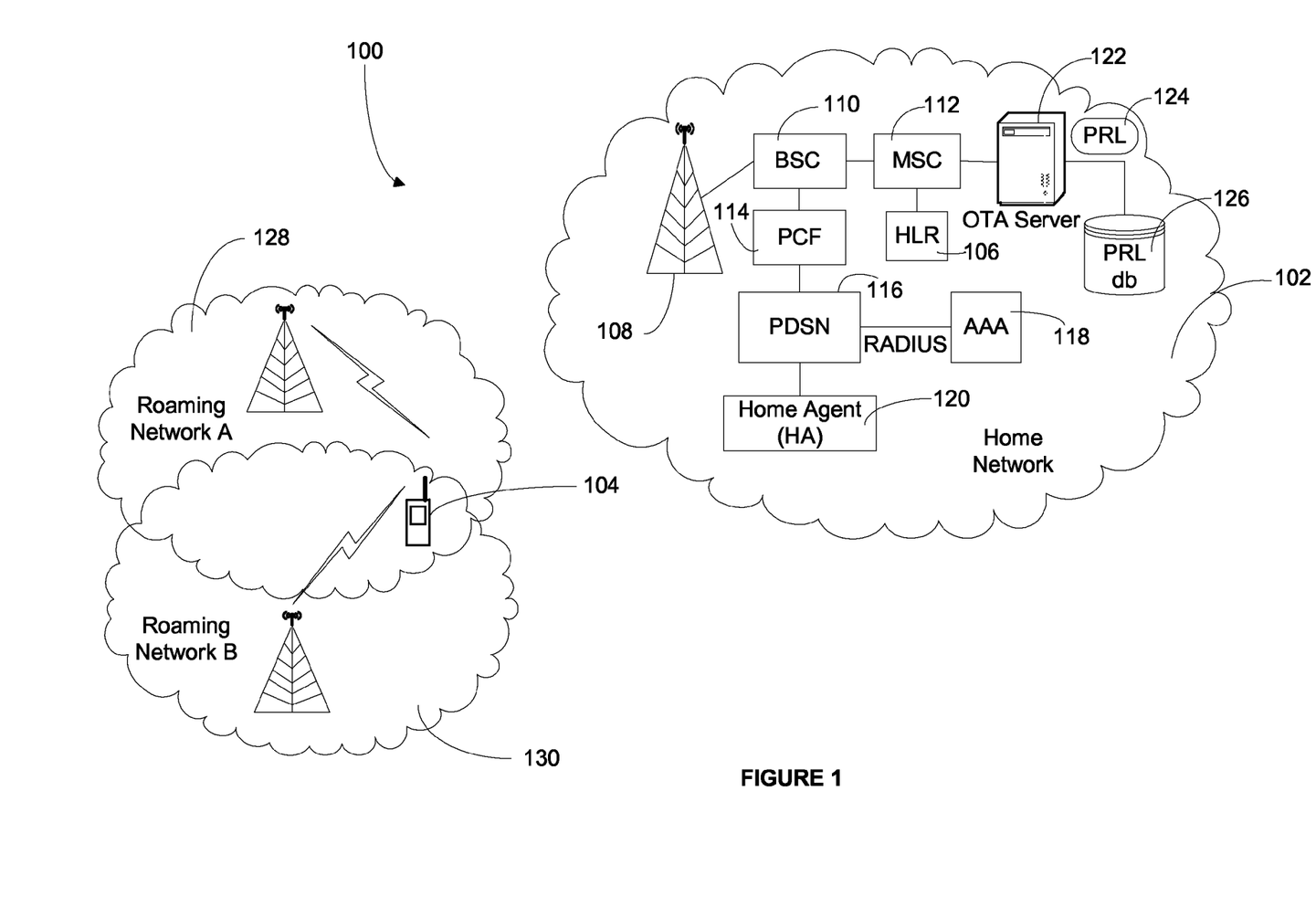
FIG. 1 is a schematic diagram illustrating a mobile environment in accordance with an embodiment of the invention.

Turning to FIG. 1, an implementation of a particular embodiment of the present invention within a mobile environment 100 is shown. To facilitate service-based roaming and ensure selection of an optimum roaming network, a home wireless network 102 communicates an improved Preferred Roaming List (PRL) that includes service type and service priority indicators for a plurality of roaming networks to a mobile device 104. In this embodiment, the home wireless network 102 operates in accordance with a CDMA2000 specification and includes data and location based services delivered via one or more data access protocols, such as EV-DO, EV-DV or the like. Other embodiments include a home wireless network 102 complying with one or more of WCDMA, UMTS, GSM, GPRS, EDGE, WiFi (i.e., IEEE 802.11x), WiMAX (i.e., IEEE 802.16), or similar telecommunication standards capable of delivering voice and/or data services within a home geographical area to a mobile device 104. Embodiments of the mobile device 104 include a mobile phone, a PDA, or a mobile computer (e.g., a laptop) having wireless capability.

While in the home geographical area, the mobile device 104 gains access to radio access network resources by authenticating its identity at the home location register (HLR) 106. The HLR 106 contains a database of subscribers to the home network 102, including Mobile Identification Numbers (MIN) and/or Electronic Serial Numbers (ESN) associated with each subscriber's mobile device. The radio access network resources are used to control the radio interface aspect of the network 102 and include a plurality of base stations 108, as well as one or more base station controllers (BSC) 110. The base station 108 includes radio bearer resources and other transmission equipment necessary for wireless communication of information between the mobile device 104 and other network elements. The BSC 110 manages the radio traffic between a plurality of base stations 108, such as by controlling handoff between sectors and/or base stations. Additionally, the mobile switching center (MSC) 112 is responsible for management of voice calls placed in and out of the home network 102. In this embodiment, the BSC 110 is collocated with a packet control function (PCF) 114. When the network 102 comprises multiple packet data serving nodes 116 (PDSN), the PCF 114 routes the data packets to the appropriate PDSN for further processing. The accounting authentication authorization (AAA) server 118 ensures that the subscriber associated with the mobile device 104 is allowed to use the data resources of the home network 102. The AAA server 118 communicates with the PDSN 116 via the RADIUS protocol. Upon completion of the user authorization process for the use of data resources, the home agent 120 forwards the mobile device's IP address, received from the AAA server 118, to the PDSN 116, which, in turn, forwards it to the mobile device 104. The HA 120 is a router, located on the mobile device's home network 102, which tunnels packets to the mobile device 104 when it is roaming on another network.

To control which partner networks are accessed by the mobile device 104 during roaming (either outside of the home geographic area, or during home network unavailability, for example), the Over-the-Air (OTA) server 122 pushes an improved Preferred Roaming List (PRL) 124 to the mobile device 104. The OTA server 122 is connected to a PRL database 126 that stores the PRL 124. In one embodiment, the PRL database 126 is collocated with the OTA server 122. Other embodiments include a separate database 126 that is used to administer the PRL 124 from a central location (e.g., a network operations center) that manages multiple wireless networks operated by one or more wireless service providers. The OTA server 122 communicates the PRL 124 to the mobile device 104 using traffic channel data burst messages transmitted in accordance with an over-the-air service provisioning (OTASP) and over-the-air parameter administration (OTAPA) air interface, such as the IS-683 family of interfaces. In embodiments, the OTA server 122 communicates with the MSC 112 via either a local or an external SS7 network.

To provide service-based roaming, an embodiment of the improved Preferred Roaming List 124 includes service type and service priority indicators for a plurality of roaming networks 128, 130. Preferably, the service type indicator is a numerical indicator that encodes a given combination of wireless services offered by each roaming partner network 128, 130. By encoding an entire combination of services offered by each roaming partner network into a single indicator, the service type indicator provides a scalable solution that is capable of taking into account additional future services without the need to add multiple dedicated service fields to the PRL. When the mobile device 104 initiates a request for a particular wireless service while roaming (e.g., a location based application request, a general data service request via a mobile browser, or a voice service request), the mobile device 104 scans its memory for the improved PRL 124 previously received from the OTA server 122 and identifies those roaming networks 128, 130 that are capable of providing the requested service within their service mix. This prevents unsuccessful wireless service requests that may be initiated on a default roaming network selected during the mobile device's idle state when the default roaming network does not support the requested service. In case when more than one roaming network provides the requested wireless service, the service priority indicator provides a priority of selection of roaming networks for a given requested service to ensure selection of an optimum network in accordance with home service provider and/or mobile device requirements.

Figure 2:
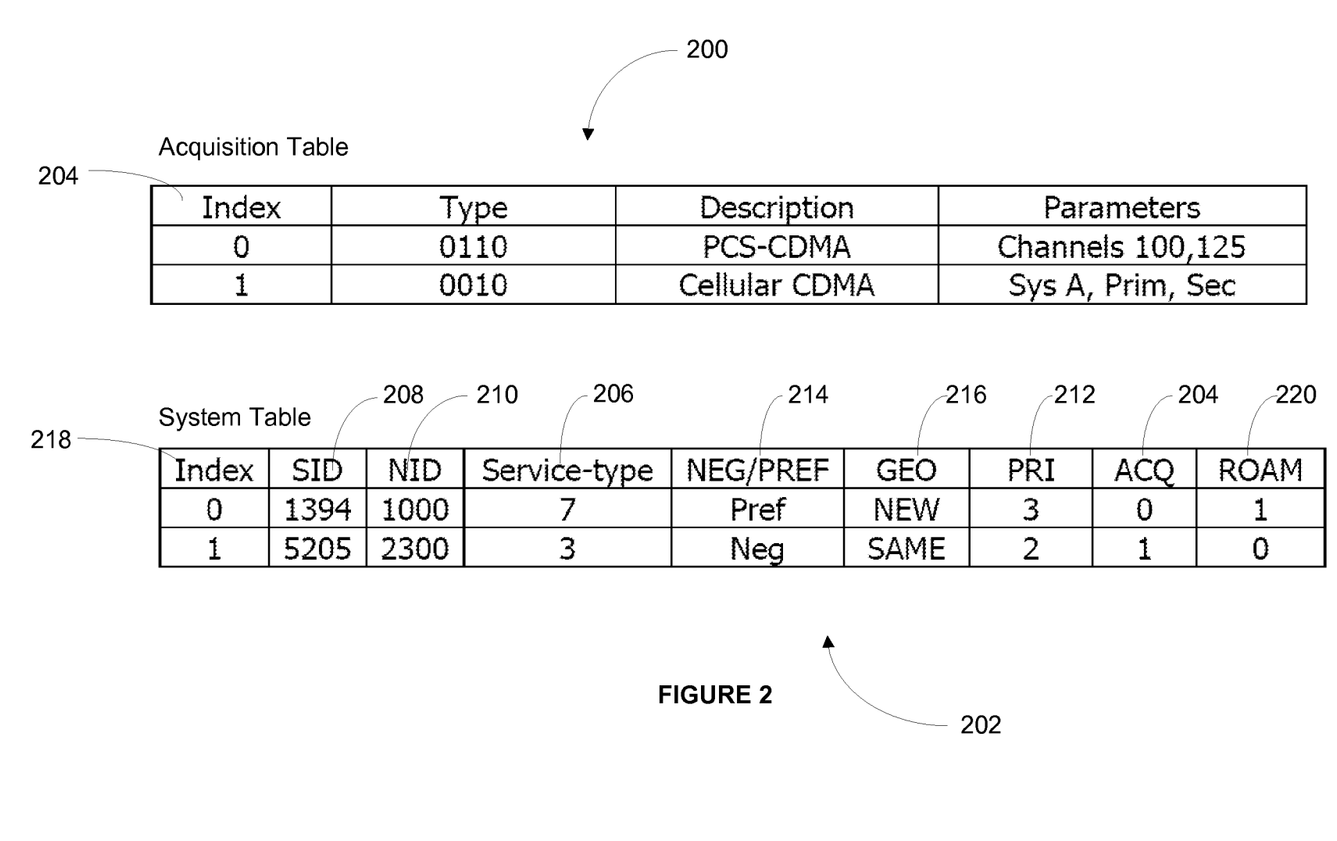
FIG. 2 is a schematic diagram illustrating an improved Preferred Roaming List, in accordance with an embodiment of the invention.

Turning to FIG. 2, an embodiment of the improved Preferred Roaming List 124, is shown. The PRL 124 comprises an acquisition table 200, which remains stored in computer readable memory of the PRL database 126, as well as the improved system table 202 that is pushed to the mobile device 104 over-the-air and is stored in its memory. The acquisition table 200 comprises channel and system descriptors corresponding to a plurality of roaming networks available for scanning by the mobile device 104, wherein each roaming network is assigned an index 204. The first roaming network in the acquisition table is assigned an index of zero (0), while the second network is assigned an index of one (1), and so on. The system table 202 includes a System Id (SID) 208 and Network Id (NID) 210 identifier pair representing each indexed roaming network. Each SID 208 may have one or more NIDs 210, for example when a given wireless service provider operates multiple sub-networks. The service type indicator 206 comprises a numerical indicator that encodes a particular combination of wireless services offered by a roaming network corresponding to a given SID and NID identifier pair. For instance, when a particular roaming network is capable of offering multiple wireless services (e.g., voice, data, location based applications), the service type indicator encodes the specific combination of services into a single numerical indicator 206, as discussed in further detail below with respect to FIG. 3.

When more than one roaming network provides the requested wireless service, the service priority indicator 212 provides a mechanism for selection of a most optimal roaming network in accordance with one or more predetermined priorities. Preferably, the service priority indicator 212 numerically indicates the service level preferences for each roaming network (SID/NID pair). In one embodiment, priority level "1" indicates that the corresponding roaming network is preferable for a "Voice Only" service request. Similarly, priority level "2" indicates that the corresponding roaming network is preferable for a "Voice and Data" service request, while priority level "3" indicates that the roaming network is preferable for a "Location Based Services Only" ("LBS Only") service request. Hence, if multiple roaming networks in the system table 202 include the requested service in the combination of offered services designated by the service type indicator 206, the mobile device 104 sorts the matching networks in the order of priority corresponding to the type of the service request and selects the roaming network with highest priority. Preferably, the service priority indicator 212 is based on one or more parameters associated with each service offered by a given roaming network. For instance, each roaming network is ranked by service cost (e.g., cost per minute, or per kilobyte in accordance with a roaming agreement between the home network 102 and roaming networks 128, 130), historical reliability of the service (e.g., based on customer complaint data and/or statistical metrics collected, processed and stored at the OTA server 122 and/or PRL database 126), average data throughput associated with the service (if applicable), and one or more Service Level Agreement (SLA) parameters guaranteed by a given roaming network (e.g., a minimum guaranteed data rate, or a maximum drop call rate).

In accordance with IS-683, the remaining indicators in the system table 202 of the PRL 124 include "preferred" and "negative" network indicators 214 (e.g., forbidden networks are indicated as "negative," while all allowed roaming networks are indicated as "preferred"), a geographic indicator 216 (indicating whether a particular roaming network covers a new or the same geographic location as the previous entry), an acquisition table index 204 (mirrored by the system table index 218), and a roaming indicator 220 where "1" and "0" correspondingly indicate whether or not to display the roaming status at the mobile device 104 during roaming.

Figure 3:
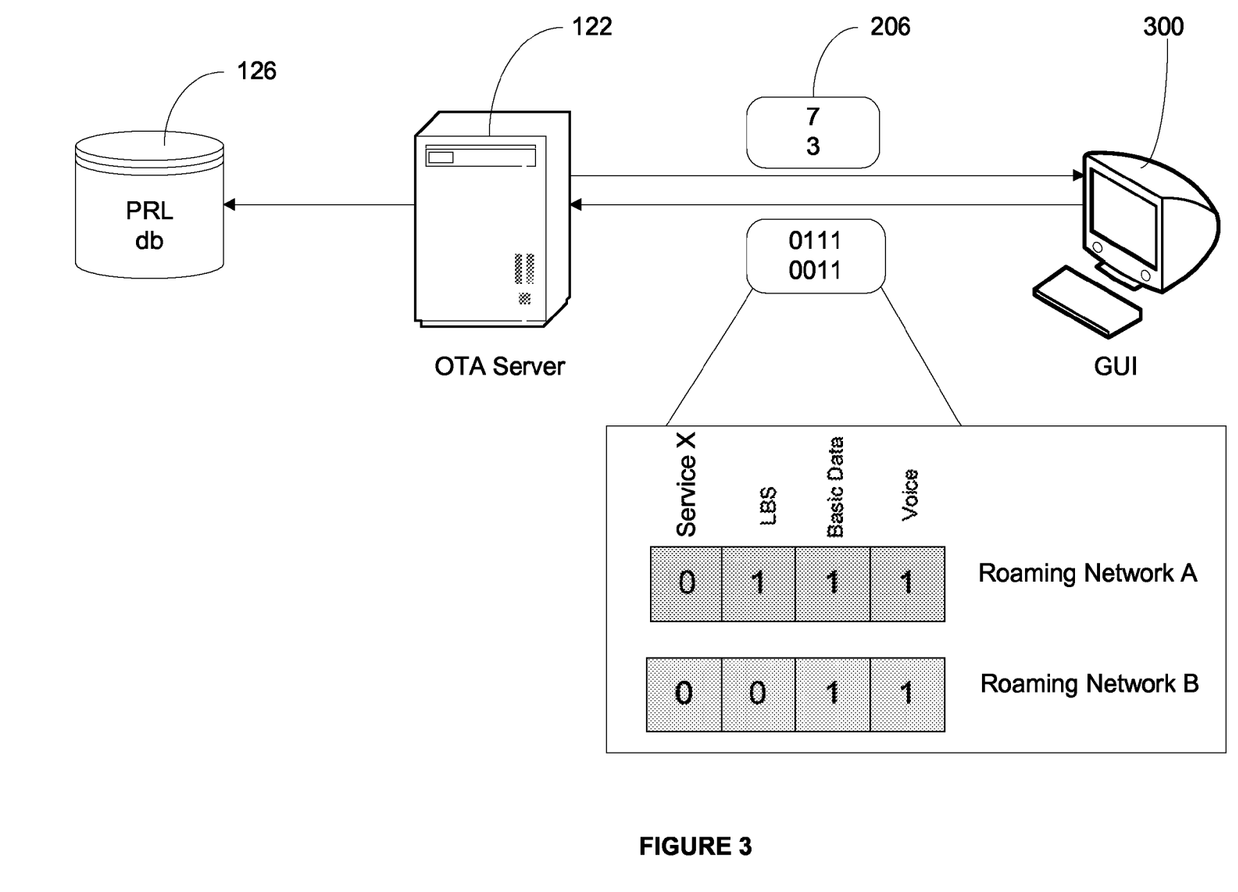
FIG. 3 is a schematic diagram of a system for representing a specific combination of services by encoding such combination into a numerical service type indicator, in accordance with an embodiment of the invention.

Referring to FIG. 3, an embodiment of efficiently representing a specific combination of services by encoding such combination into a single numerical service type indicator 206 is shown. The OTA server 122 receives an input of service availability for each roaming network 128, 130. In one embodiment, the OTA server 122 receives input of service availability from an operation and maintenance computer 300 having a graphical user interface (GUI) that allows the user to indicate whether a given wireless service is offered by a particular roaming network forming the PRL 124. For instance, the GUI allows an indication of availability of each service by checking a box or choosing a "Yes" or "No" indicator from a drop down list. When a particular wireless service is available, an indication of its availability by the user results in a binary one (1) collected by the GUI of the operation and maintenance computer 300. When a particular service is not offered by a given roaming network, an indication of its unavailability by the user results in a binary zero (0) collected by the GUI of the operation and maintenance computer 300. Hence, depending on the total number of services for which information is collected via the GUI 300, the OTA server 122 receives a binary word of a predetermined bit length, wherein each bit indicates availability of certain wireless service for the corresponding roaming network. In the illustrated example, roaming network A does not offer "Service X" (e.g., a particular wireless application, such as music downloads), but offers location based services (LBS), as well as basic data and voice services. Hence, the OTA server 122 receives a binary word combination of "0111." Likewise, roaming network B does not offer "Service X" and LBS services, but does offer basic data and voice services. Therefore, the OTA server 122 receives a binary word combination of "0011" from the operation and maintenance computer 300. The OTA server 122 stores each service combination at the PRL database 126. In order to efficiently represent the collected binary service combinations in the system table 202 of the PRL 124, the OTA server 122 processes each binary word combination and converts it to a decimal equivalent that is used to populate a single service type field. This minimizes the size and complexity of the PRL 124 by reducing the number of fields necessary to represent and store a particular service combination for each roaming network. Hence, the service type indicator 206 will support future services in a single field (e.g., by encoding a new service combination into a numerical indicator that includes the additional service). In the foregoing example, the service combination of "0111" for roaming network A is converted to decimal numeral "7," which is then displayed to the user of the operation and maintenance computer 300 in the PRL 124. Likewise the service combination of "0011" for roaming network B is converted to decimal numeral "3" and displayed as such in the PRL 124. While a separate operation and maintenance computer and GUI 300 are described in the foregoing example, those skilled in the art will appreciate that these components may also be part of the OTA server 122 or another special-purpose computer associated with the home network 102.

Figure 4:
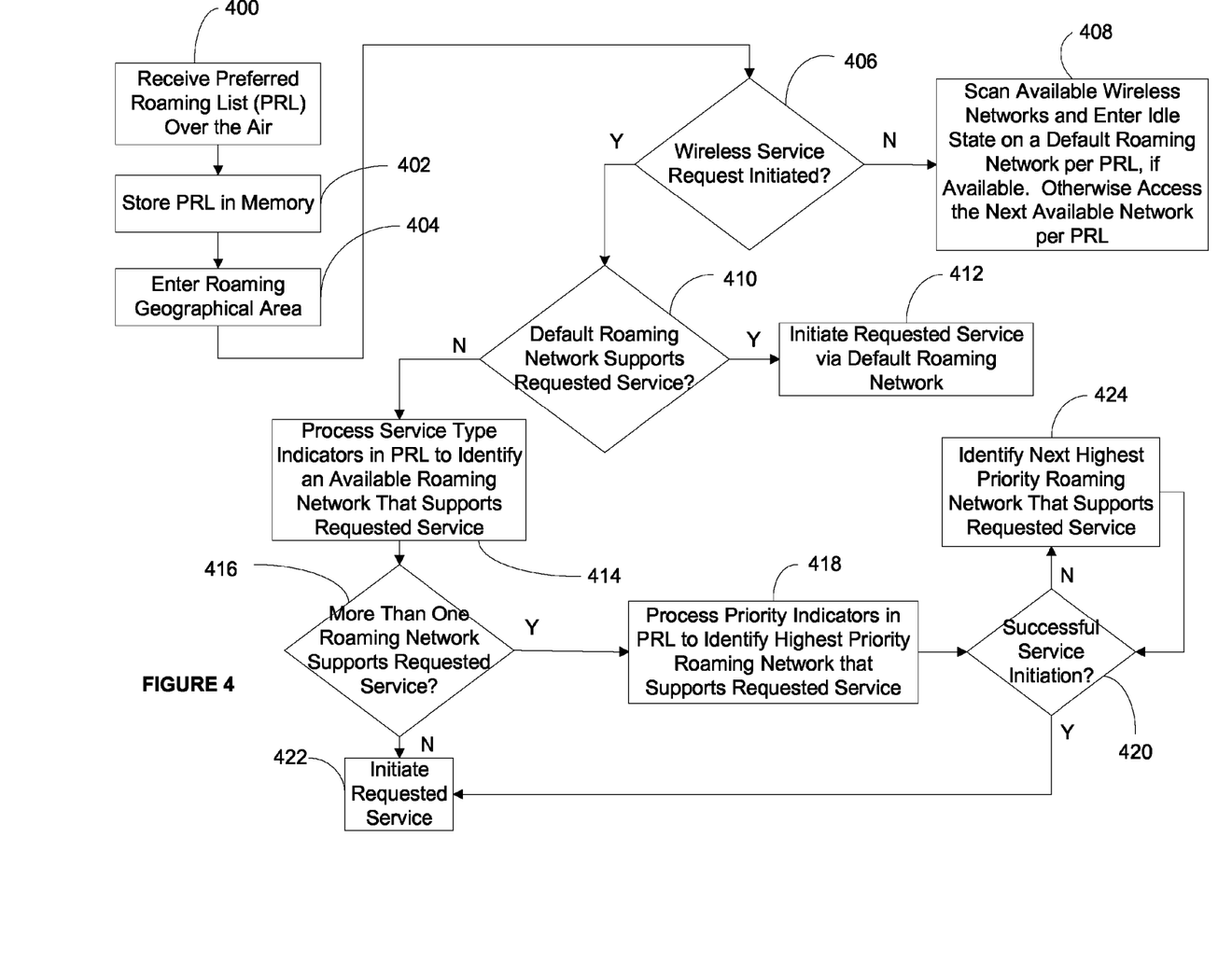
FIG. 4 is a flow chart of a method for accessing a wireless service via an improved Preferred Roaming List of FIG. 2, in accordance with an embodiment of the invention.

Turning to FIG. 4, an embodiment of a method for accessing a wireless service via an improved Preferred Roaming List is shown. In steps 400-402, the mobile unit 104 receives an over-the-air update of the PRL system table 202 from the OTA server 122 and stores the PRL system table 202 in its memory. When the mobile unit 104 enters geographical area where roaming is required, it scans available wireless networks and enters an idle state on a default roaming network if a wireless service request is not being initiated, steps 404-408. In an embodiment, a roaming network corresponding to an index of zero (0) on the PRL system table 202 is selected as the default roaming network to access during the idle state (i.e., when a wireless service request is not initiated). If, however, a wireless service request has been initiated, the mobile device 104 checks whether the default roaming network supports the requested wireless service, step 410. If the default roaming network supports the requested service, the mobile device 104 proceeds to initiate the service via the default roaming network, step 412. Otherwise, the mobile device 104 processes the service type indicators 206 in the PRL system table 202 stored in its memory to identify one or more roaming networks that support the requested wireless service, step 414. Specifically, the mobile unit 104 identifies the service type indicators that correspond to service combinations that include the requested service. For instance, when a basic data service is requested (e.g., the mobile device 104 launches a web browser application), the mobile device identifies service combinations of "3" and "7" in the example of FIG. 3 above as both supplying basic data service.

If more than one roaming network supports the requested service, the mobile unit 104 next processes the service priority indicators 212 to identify a roaming network having the highest priority for the requested service (e.g., based on cost, historical performance, or other criteria) and attempts to initiate the service on such network if it is available, steps 416-422. If the roaming network with the highest service priority is not available (e.g., signal strength or bit error rate below predetermined thresholds), the mobile device 104 identifies another roaming network in the PRL 124 with the next highest priority for the requested service and attempts to access such network, step 424. In case when only one roaming network supports the requested service in step 416, the mobile device 104 attempts to initiate the service on such network.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A wireless communication system for service-based roaming, the system comprising:
    a home wireless network providing access to a wireless communication device in a home geographic area;
    a server associated with the home wireless network; and
    a database associated with the server for storing in computer readable memory a Preferred Roaming List comprising a service type indicator corresponding to a SID (System ID) and NID (Network ID) identifier pair, the SID and NID identifier pair representing a roaming network corresponding to a geographical area served by a roaming service provider and available to the wireless communication device for roaming;
    wherein the service type indicator is a numerical indicator that encodes a combination of wireless services offered by the roaming network, said server capable of causing the Preferred Roaming List to be communicated to the wireless communication device for making a selection of the roaming network based at least in part on the combination of wireless services encoded by the service type indicator.

2. The system of claim 1 wherein the service type indicator is derived by transforming a plurality of binary indicators, each binary indicator physically representing availability of a type of wireless service offered by the roaming network, into a decimal indicator.

3. The system of claim 1 wherein the Preferred Roaming List further comprises a service priority indicator for prioritizing the selection of the roaming network based on at least one parameter associated with one or more services in the combination of wireless services offered by the roaming network.

4. The system of claim 3 wherein the at least one parameter is selected from the group consisting of cost of service, historical service reliability, minimum guaranteed data rate, maximum guaranteed drop call rate, and a data rate associated with the service.

5. The system of claim 1 wherein the wireless services include a voice service.

6. The system of claim 1 wherein the wireless services include a data service.

7. The system of claim 1 wherein the wireless services include a location based service.

8. A method for accessing a wireless service on a roaming wireless network via a Preferred Roaming List, the method comprising:
    receiving the Preferred Roaming List via one or more over-the-air messages, the Preferred Roaming List comprising a numerical service type indicator encoding a combination of wireless services offered by the roaming wireless network, the service type indicator corresponding to a SID and NID identifier pair, the SID and NID identifier pair representing the roaming wireless network corresponding to a geographical area served by a roaming service provider and available to a wireless communication device for roaming;
    storing the Preferred Roaming List in computer readable memory of the wireless communication device;
    accessing a default roaming wireless network during an idle state of the wireless communication device, in accordance with the Preferred Roaming List;
    processing a wireless service request for accessing the wireless service; and
    in response to the service request, selecting the roaming wireless network based at least in part on the combination of wireless services encoded by the service type indicator when the default roaming wireless network does not support the requested wireless service.

9. The method of claim 8 further comprising deriving the service type indicator by transforming a plurality of binary indicators, each binary indicator representing physical availability of a type of wireless service offered by the roaming network, into a decimal indicator.

10. The method of claim 8 further comprising prioritizing the selection of the roaming network based on at least one parameter associated with one or more services in the combination of wireless services offered by the roaming network.

11. The method of claim 10 wherein the at least one parameter is selected from the group consisting of cost of service, historical service reliability, minimum guaranteed data rate, maximum guaranteed drop call rate, and a data rate associated with the service.

12. The method of claim 8 wherein a service in the combination of wireless services is selected from the group consisting of a voice service, a data service, and a location based service.

13. A method for managing a Preferred Roaming List for a wireless communication device, the method comprising:
    storing, in a computer readable memory, a Preferred Roaming List comprising a service type indicator corresponding to a roaming network in a geographical area served by a roaming service provider and available to the wireless communication device for roaming, said service type indicator comprising a numerical indicator encoding a combination of wireless services offered by the roaming service provider; and
    communicating the Preferred Roaming List to the wireless communication device for making a selection of the roaming network based at least in part on the combination of wireless services encoded by the service type indicator.

14. The method of claim 13 further comprising deriving the service type indicator by transforming a plurality of binary indicators, each binary indicator representing physical availability of a type of wireless service offered by the roaming network, into a decimal indicator.

15. The method of claim 13 further comprising prioritizing the selection of the roaming network based on at least one parameter associated with one or more services in the combination of wireless services offered by the roaming network.

16. The method of claim 15 wherein the at least one parameter is selected from the group consisting of cost of service, historical service reliability, minimum guaranteed data rate, maximum guaranteed drop call rate, and a data rate associated with the service.

17. The method of claim 13 wherein a service in the combination of wireless services is selected from the group consisting of a voice service, a data service, and a location based service.

* * * * *